United States Patent
Iwamura et al.

(10) Patent No.: US 10,036,672 B2
(45) Date of Patent: Jul. 31, 2018

(54) OPTICAL FIBER STRAIN AND TEMPERATURE MEASUREMENT APPARATUS

(71) Applicant: Oki Electric Industry Co., Ltd., Tokyo (JP)

(72) Inventors: Hideyuki Iwamura, Tokyo (JP); Kengo Koizumi, Tokyo (JP); Hitoshi Murai, Tokyo (JP)

(73) Assignee: Oki Electric Industry Co., Ltd., Tokyo (JP)

( * ) Notice: Subject to any disclaimer, the term of this patent is extended or adjusted under 35 U.S.C. 154(b) by 0 days.

(21) Appl. No.: 15/640,660

(22) Filed: Jul. 3, 2017

(65) Prior Publication Data

US 2018/0094987 A1 Apr. 5, 2018

(30) Foreign Application Priority Data

Sep. 30, 2016 (JP) ................................ 2016-193605

(51) Int. Cl.
| | | |
|---|---|---|
| *G01D 5/353* | (2006.01) | |
| *G01K 11/32* | (2006.01) | |
| *G01L 1/24* | (2006.01) | |

(52) U.S. Cl.
CPC .............. *G01K 11/32* (2013.01); *G01L 1/242* (2013.01); *G01K 2011/322* (2013.01)

(58) Field of Classification Search
CPC .... G01B 9/02001; G01D 5/266; G01D 5/353; G01D 5/35303; H01S 5/00
See application file for complete search history.

(56) References Cited

U.S. PATENT DOCUMENTS

| | | | |
|---|---|---|---|
| 9,823,098 B2* | 11/2017 | Bastianini | .......... G01D 5/35335 |
| 2015/0211900 A1* | 7/2015 | Xue | ....................... G01K 11/32 |
| | | | 356/73.1 |

(Continued)

FOREIGN PATENT DOCUMENTS

JP 2015-072546 A 4/2015

OTHER PUBLICATIONS

K. Koizumi et al., "High-Speed Distributed Strain Measurement using Brillouin Optical Time-Domain Reflectometry Based-on Self-Delayed Heterodyne Detection", ECOC2015, p. 1. 07, Sep. 2015.

*Primary Examiner* — Jonathan Hansen
(74) *Attorney, Agent, or Firm* — Rabin & Berdo, P.C.

(57) ABSTRACT

By removing remaining components of Rayleigh scattered light, control is sufficiently performed of polarization states even when the wavelength of scattered light has changed. A light source unit configured to generate probe light, a wavelength control unit configured to receive backscattered light emitted from an optical fiber to be tested by the probe light and to output Brillouin backscattered light included in the backscattered light, and a self-delayed heterodyne interferometer to which the Brillouin backscattered light is input are included. The wavelength control unit includes a wavelength separation filter, a variable wavelength filter, an optical intensity measurement unit, and a control unit. The wavelength separation filter has two output ports, outputs and transmits, from one of the two output ports, the Brillouin backscattered light to the variable wavelength filter, and outputs and transmits, from the other output port, Rayleigh scattered light to the optical intensity measurement unit. The optical intensity measurement unit measures a center wavelength and a peak intensity of the Rayleigh scattered light. The control unit controls a cutoff wavelength of the variable (Continued)

wavelength filter in accordance with a direction and amount of change of the center wavelength.

5 Claims, 2 Drawing Sheets

(56) References Cited

U.S. PATENT DOCUMENTS

2017/0059428 A1* 3/2017 Hill .................. G01K 11/32
2017/0299463 A1* 10/2017 Lecoeuche ......... G01M 11/3127

* cited by examiner

OPTICAL FIBER STRAIN AND TEMPERATURE MEASUREMENT APPARATUS

CROSS REFERENCE TO RELATED APPLICATION(S)

This application is based upon and claims benefit of priority from Japanese Patent Application No. 2016-193605, filed on Sep. 30, 2016, the entire contents of which are incorporated herein by reference.

BACKGROUND

The present invention relates to an optical fiber strain and temperature measurement apparatus using Brillouin scattered light.

With the evolution of optical fiber communications, distributed optical fiber sensing, in which the optical fiber itself serves as the sensing medium, has become an active area of research. Representative distributed optical fiber sensing is optical time domain reflectometry (OTDR), in which optical pulses are launched into an optical fiber from one end of the optical fiber, and light backscattered within the optical fiber is measured with respect to time. Backscattering in an optical fiber includes Rayleigh scattering, Brillouin scattering, and Raman scattering. Among others, OTDR that measures spontaneous Brillouin scattering is referred to as Brillouin OTDR (BOTDR) (see, for example, K. Koizumi, et al., "High-Speed Distributed Strain Measurement using Brillouin Optical Time-Domain Reflectometry Based-on Self-Delayed Heterodyne Detection", ECOC2015, P.1.07, September 2015).

Brillouin scattering can be observed at frequencies frequency-shifted on Stokes and anti-Stokes side with the frequency shift of the order of GHz with respect to the center frequency of the optical pulse launched into the optical fiber. The spectrum of Brillouin scattering is referred to as the Brillouin gain spectrum (BGS). The frequency shift and the spectral line width of the BGS are referred to as the Brillouin frequency shift (BFS) and the Brillouin line width, respectively. The BFS and the Brillouin line width vary depending on the material of the optical fiber and the wavelength of the incident light. For example, in the case of silica-based standard single-mode optical fiber, it is reported that, for an incident wavelength of 1.55 µm, the frequency shift amounts of the BFS and the Brillouin line width are approximately 11 GHz and approximately 30 MHz, respectively. Also, it is known that the frequency shift amounts of the BFS associated with strain and a temperature change inside a single-mode optical fiber are 0.049 MHz/µε and 1.0 MHz/° C., respectively, for an incident wavelength of 1.55 µm.

Here, since the BFS has dependencies on strain and temperature, BOTDR has been attracting attention for the purpose of monitoring large constructions represented by bridges and tunnels, potential areas of landslide occurrence, or the like.

BOTDR generally performs heterodyne detection to measure spectrum waveform of spontaneous Brillouin scattered light arising in an optical fiber with the use of reference light prepared separately. The intensity of spontaneous Brillouin scattered light is lower than the intensity of Rayleigh scattering light by two through three orders of magnitude. Thus, heterodyne detection is useful in increasing the minimum light receiving sensitivity.

SUMMARY

Here, even the application of heterodyne detection does not offer a sufficient signal-to-noise ratio (S/N) as spontaneous Brillouin scattered light is very weak. This leads to a necessity of an averaging process for S/N improvement. Due to the averaging process and the obtainment of the three-dimensional information described above, it is difficult for conventional optical fiber strain measurement apparatuses to shorten the measurement time.

In light of the foregoing problem, the inventor of the present invention has considered an optical fiber strain measurement apparatus and an optical fiber strain measurement method which use spontaneous Brillouin scattered light and in which changes in frequency of light are measured as phase differences of the beat signal given by coherent detection, thereby obtaining two-dimensional information with axes of time and phase, and has submitted a patent application (Japanese Patent Application No. 2015-072546) based on a part of the consideration results.

According to the optical fiber strain measurement apparatus and the optical fiber strain measurement method of the previous application, by using self-delayed heterodyne BOTDR (SDH-BOTDR) technique, changes in frequency of light are measured as phase differences of the beat signal given by coherent detection, thereby obtaining two-dimensional information with axes of time and phase. In this SDH-BOTDR, as no frequency sweep is required, measurement time is shortened as compared to the prior art which requires obtaining three-dimensional information.

However, to perform reception with higher accuracy, there is a need to equally perform control of polarization states of light propagating through first and second light paths which constitute a so-called self-delayed heterodyne interferometer. To control the polarization states in the self-delayed heterodyne interferometer, a polarization controller is provided in one of the first and second light paths and a signal from a PD is measured via a band pass filter of the same frequency band as the frequency of a local oscillation electrical signal, and polarization control is performed such that the intensity of light received by the PD is maximized Here, when the power of backscattered light from an optical fiber under test is low, the backscattered light is amplified by an optical amplifier. During this optical amplification, ASE light is generated. Therefore, a narrow band pass filter is used not only to separate Rayleigh scattered light and Brillouin scattered light from each other, but also to block ASE light generated by optical amplification.

However, when there is a mismatch between the center wavelength of Brillouin backscattered light and the center wavelength of the narrow band pass filter, the intensity of necessary Brillouin backscattered light may be lowered, while the intensity of unnecessary Rayleigh scattered light is increased, which reduces S/N. In this case, control of polarization states is not sufficiently performed.

The present invention has been made in view of the above problems and it is an object of the present invention to provide an optical fiber strain and temperature measurement apparatus wherein, by removing remaining components of Rayleigh scattered light which have failed to be removed sufficiently by an OBPF, it is possible to sufficiently perform control of polarization states even when the wavelength of scattered light has changed.

According to an embodiment of the present invention, there is provided an optical fiber strain and temperature measurement apparatus including a light source unit configured to generate probe light, a wavelength control unit configured to receive backscattered light emitted from an optical fiber to be tested by the probe light and to output Brillouin backscattered light included in the backscattered light, and a self-delayed heterodyne interferometer to which the Brillouin backscattered light is input.

The wavelength control unit includes a wavelength separation filter, a variable wavelength filter, an optical intensity measurement unit, and a control unit. The wavelength separation filter has two output ports, outputs and transmits, from one of the two output ports, natural Brillouin scattered light to the variable wavelength filter, and outputs and transmits, from the other output port, Rayleigh scattered light to the optical intensity measurement unit. The optical intensity measurement unit measures a center wavelength and a peak intensity of the Rayleigh scattered light. The control unit controls a cutoff wavelength of the variable wavelength filter in accordance with a direction and amount of change of the center wavelength. The variable wavelength filter operates at a cutoff wavelength that is set under control of the control unit.

According to another preferable embodiment of the optical fiber strain and temperature measurement apparatus of the present invention, the wavelength control unit includes a first variable wavelength filter, a second variable wavelength filter, an optical intensity measurement unit, and a control unit. The first variable wavelength filter has two output ports, transmits Rayleigh scattered light to the optical intensity measurement unit, and outputs and transmits, from the other of the two output ports, a component other than the Rayleigh scattered light to the second variable wavelength filter. The optical intensity measurement unit measures a center wavelength and a peak intensity of the Rayleigh scattered light. The control unit controls a cutoff wavelength of the second variable wavelength filter in accordance with a direction and amount of change of the center wavelength. The second variable wavelength filter operates at a cutoff wavelength that is set under control of the control unit.

According to the optical fiber strain and temperature measurement apparatus of the present invention, remaining components of Rayleigh scattered light which have failed to be removed by the wavelength separation filter can be removed by a band rejection type variable wavelength filter that is disposed downstream of the wavelength separation filter. Even when the wavelength of scattered light has changed, it is also possible to suppress reduction of S/N of a received signal by performing feedback control such that the set wavelength of the band rejection type variable wavelength filter matches the wavelength of Rayleigh scattered light. This makes it possible to equally perform sufficient control of polarization states of light propagating through the first and second light paths.

DETAILED DESCRIPTION OF THE EMBODIMENT(S)

Figure 1:
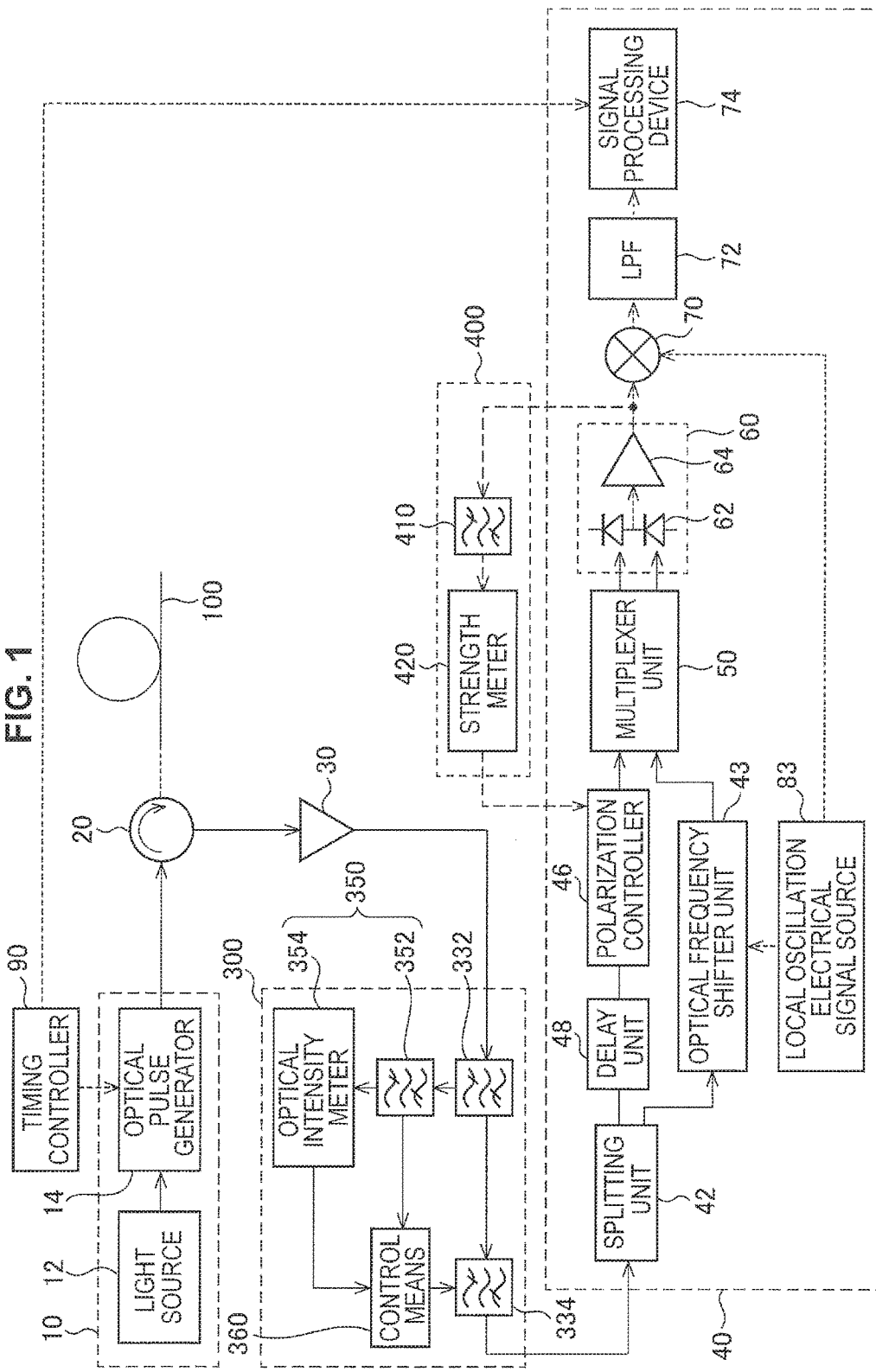
FIG. 1 is a schematic block diagram of a first measurement apparatus.

Hereinafter, referring to the appended drawings, preferred embodiments of the present invention will be described in detail. It should be noted that, in this specification and the appended drawings, structural elements that have substantially the same function and structure are denoted with the same reference numerals, and repeated explanation thereof is omitted.

First Embodiment

With reference to FIG. 1, an optical fiber strain and temperature measurement apparatus (hereinafter also referred to as first measurement apparatus) of a first embodiment is described below. FIG. 1 is a schematic block diagram illustrating a first measurement apparatus.

The first measurement apparatus is configured to include a light source unit 10, a circulator 20, an optical amplifier 30, a wavelength control unit 300, a self-delayed heterodyne interferometer 40, a polarization control unit 400, and a timing controller 90.

The light source unit 10 generates probe light. The light source unit 10 includes a light source 12 configured to generate continuous light and an optical pulse generator 14 configured to generate optical pulses from the continuous light.

Here, the first measurement apparatus measures the phase difference corresponding to a frequency change. Therefore, fluctuations in the frequency of the light source 12 need to be sufficiently smaller than a Brillouin shift. Thus, a frequency stabilized laser is used as the light source 12. For example, the Brillouin shift corresponds to 4 MHz when the strain of an optical fiber 100 to be tested (hereinafter also referred to as an optical fiber under test) is 0.008%. Therefore, to measure a strain of about 0.008%, it is preferable that fluctuations in the frequency of the light source 12 be sufficiently smaller than 4 MHz.

The optical pulse generator 14 is configured with any suitable conventionally well-known acousto-optic (AO) modulator or electric optical (EO) modulator. The optical pulse generator 14 generates optical pulses from continuous light in response to electrical pulses generated at the timing controller 90. The repetition period of the optical pulses is set longer than the round trip time for an optical pulse along the optical fiber under test 100. The optical pulses are outputted as the probe light from the light source unit 10.

Probe light output from the light source unit 10 is incident on the optical fiber under test 100 via the circulator 20. A combination of an optical coupler and an isolator may be used instead of the circulator 20.

The backscattered light from the optical fiber under test 100 is transmitted to the optical amplifier 30 via the circulator 20. The backscattered light amplified by the optical amplifier 30 is transmitted to the wavelength control unit 300.

The wavelength control unit 300 includes a narrow band wavelength separation filter 332, a band rejection type variable wavelength filter 334, an optical intensity measurement unit 350, and a control means (control unit) 360.

The wavelength separation filter 332 has two output ports. Backscattered light amplified by the optical amplifier 30 is input to the wavelength separation filter 332.

Natural Brillouin scattered light included in the backscattered light is output from one of the output ports of the wavelength separation filter 332 and is then transmitted to the band rejection type variable wavelength filter 334. The band rejection type variable wavelength filter 334 blocks wavelength components of Rayleigh scattered light and transmits other wavelength components to the self-delayed heterodyne interferometer 40.

In addition, Rayleigh scattered light included in the backscattered light is output from the other output port of the wavelength separation filter 332 and is then transmitted to the optical intensity measurement unit 350.

The optical intensity measurement unit 350 includes a variable wavelength filter 352 and an optical intensity meter 354. The optical intensity meter 354 measures the intensity of light that has been transmitted through the variable wavelength filter 352. Results of the measurement by the optical intensity meter 354 and information regarding the transmitted wavelengths of the variable wavelength filter 352 are provided to the control means 360.

The control means 360 acquires and holds information such as the center wavelength of Rayleigh scattered light on the basis of the information received from the optical intensity measurement unit 350. When the center wavelength of the Rayleigh scattered light changes, the control means 360 controls the wavelength of the band rejection type variable wavelength filter 334 in accordance with the direction and amount of the change of the center wavelength and thus allows the band rejection type variable wavelength filter 334 to block the Rayleigh scattered light. The control means 360 is made of an IC chip or the like and provides predetermined functionality by a program or the like.

The wavelength separation filter 332 has a pass band of about 10 GHz and passes only natural Brillouin scattered light. Remaining components of Rayleigh scattered light which have failed to be removed by the wavelength separation filter 332 are blocked by the band rejection type variable wavelength filter 334. Natural Brillouin scattered light that has been transmitted through the wavelength separation filter 332 and the band rejection type variable wavelength filter 334 is transmitted to the self-delayed heterodyne interferometer 40. A signal $E_0(t)$ of the natural Brillouin scattered light emitted from the wavelength control unit 300 at time t is expressed by equation (1).

$$E_0(t)=A_0\exp\{j(2\pi f_b t+\phi_0)\} \qquad (1)$$

Here, $A_0$ represents amplitude, $f_b$ represents the optical frequency of the natural Brillouin scattered light, and $\phi_0$ represents initial phase.

The self-delayed heterodyne interferometer 40 includes a splitting unit 42, an optical frequency shifter unit 43, a delay unit 48, a polarization controller 46, a multiplexer unit 50, a coherent detection unit 60, a mixer unit 70, a low pass filter (LPF) 72, a local oscillation electrical signal source 83, and a signal processing device 74.

A local oscillation electrical signal source 83 generates an electrical signal having a frequency $f_{AOM}$.

The splitting unit 42 receives, via the wavelength control unit 300, and splits Brillouin backscattered light, which arises in the optical fiber under test 100 owing to the probe light, into the two branches of a first light path and a second light path.

The optical frequency shifter unit 43 is provided in the first light path. The optical frequency shifter unit 43 uses the electrical signal having the frequency $f_{AOM}$ generated by the local oscillation electrical signal source 83 to give a frequency shift of the frequency $f_{AOM}$ to the light propagating through the first light path.

In this exemplary configuration, the polarization controller 46 is provided in the second light path. The polarization controller 46 controls polarization of light propagating through the second light path in accordance with an instruction from the polarization control unit 400.

In this exemplary configuration, the delay unit 48 is also provided in the second light path. The delay unit 48 gives a delay time τ to light propagating through the second light path. The delay unit 48 is configured in any way as long as the delay unit 48 gives a delay time τ to light propagating through the second light path as compared to light propagating through the first light path. For example, when the polarization controller 46 functions as a delayer, there is no need to provide a delayer separately. Alternatively, a so-called delay line may be provided.

The multiplexer unit 50 multiplexes light propagating through the first light path and light propagating through the second light path to generate multiplexed light. An optical signal $E_1(t)$ propagating through the first light path and an optical signal $E_2(t-\tau)$ propagating through the second light path which are incident on the multiplexer unit 50 are respectively expressed by equations (2) and (3).

$$E_1(t)=A_1\exp\{j(2\pi f_b t+2\pi f_{AOM}t+\phi_1)\} \qquad (2)$$

$$E_2(t)=A_2\exp[j\{2\pi f_b(t-\tau)+\phi_2\}] \qquad (3)$$

Here, $A_1$ and $A_2$ respectively represent the amplitudes of $E_1(t)$ and $E_2(t-\tau)$, and $\phi_1$ and $\phi_2$ respectively represent initial phases of $E_1(t)$ and $E_2(t-\tau)$.

The coherent detection unit 60 performs heterodyne detection of the multiplexed light to generate a beat signal. For example, the coherent detection unit 60 includes a balance type photodiode (PD) 62 and an FET amplifier 64. A beat signal I given by heterodyne detection is expressed by equation (4).

$$I_{12}=2A_1A_2\cos\{2\pi(f_{AOM}t+f_b\tau)+\phi_1-\phi_2\} \qquad (4)$$

The beat signal generated by the coherent detection unit 60 is split into two signals, one of which is provided as a first electrical signal to the mixer unit 70. An electrical signal generated by the local oscillation electrical signal source 83 is provided as a second electrical signal to the mixer unit 70.

The mixer unit 70 performs homodyne detection of the first electrical signal and the second electrical signal to generate a homodyne signal. Here, the first and second electrical signals are each a beat signal having a frequency $f_{AOM}$ and therefore homodyne detection of the two electrical signals allows a change of $2\pi f_b\tau$ to be output as a phase difference. The Brillouin frequency $f_b$ is changed by two factors: fluctuations in the oscillation frequency of the light source unit 10 and strain of the optical fiber under test 100. However, the influence of strain of the optical fiber under test 100 is dominant since a frequency stabilized laser is used as the light source unit 10.

The other of the two signals into which the beat signal generated by the coherent detection unit 60 is split is transmitted to the polarization control unit 400. The polarization control unit 400 includes a band pass filter 410, which has the same frequency band as the frequency of an electrical signal generated by the local oscillation electrical signal source 83, and a strength meter 420. As long as this strength meter has a function of measuring the strength of an electrical signal, the strength meter can have any suitable conventionally well-known configuration.

This strength meter 420 measures the strength of an electrical signal input thereto and controls the polarization controller 46 such that the strength is maximized According to the first measurement apparatus, remaining components of Rayleigh scattered light which have failed to be removed by the wavelength separation filter 332 can be removed by the band rejection type variable wavelength filter 334 that is disposed downstream of the wavelength separation filter 332. Even when the wavelength of scattered light changes, it is also possible to suppress reduction of S/N of a received signal by performing feedback control such that the set wavelength of the band rejection type variable wavelength filter 334 matches the wavelength of Rayleigh scattered light. This makes it possible to equally perform sufficient control of polarization states of light propagating through the first and second light paths. This also does not cause unnecessary power loss of necessary Brillouin scattered light since unnecessary Rayleigh scattered light components are used for feedback control.

Second Embodiment

Figure 2:
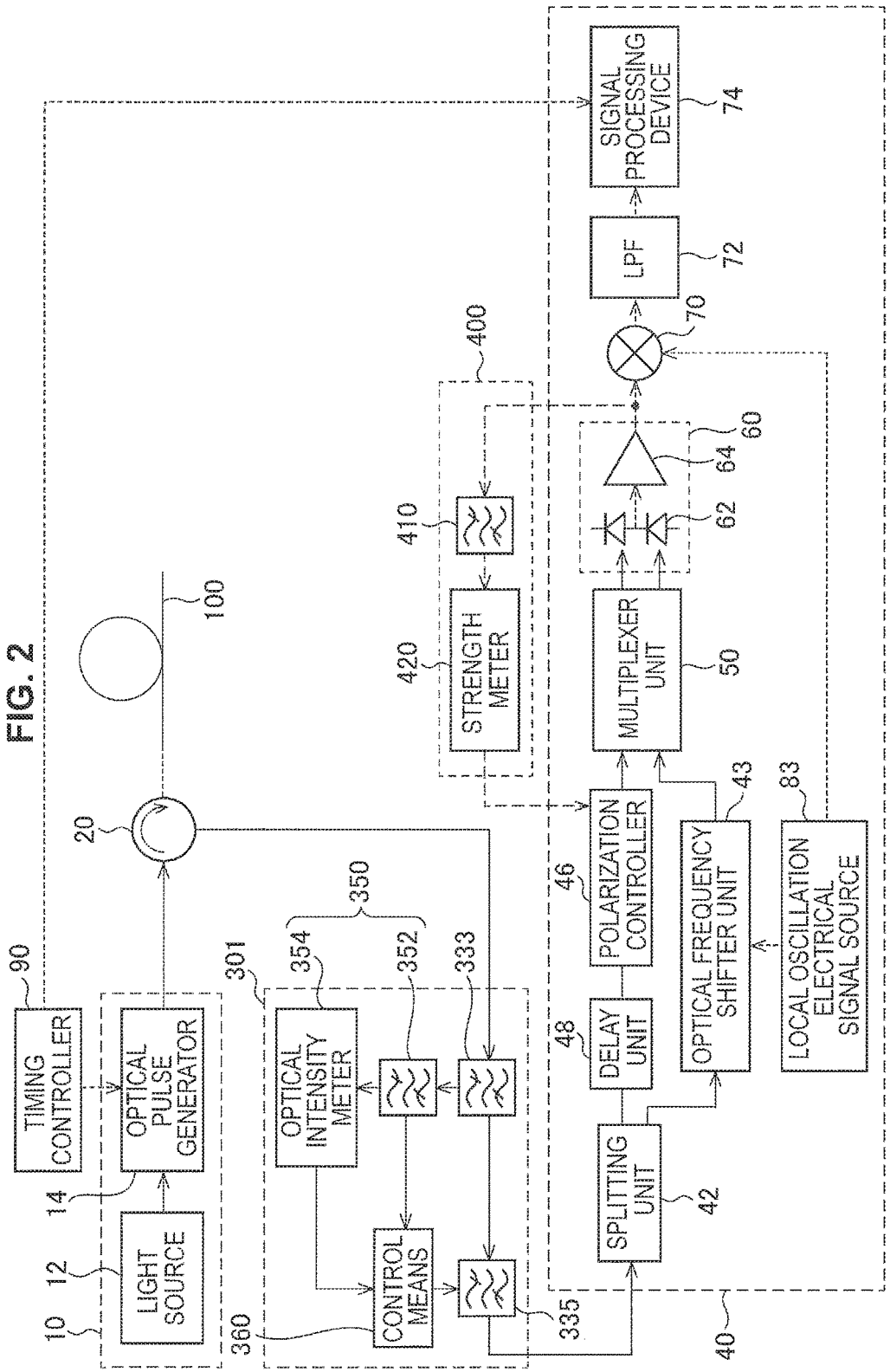
FIG. 2 is a schematic block diagram of a second measurement apparatus.

An optical fiber strain and temperature measurement apparatus of a second embodiment (hereinafter also referred to as a second measurement apparatus) is described below with reference to FIG. 2. FIG. 2 is a schematic block diagram illustrating the second measurement apparatus. The following omits some description similar to that of the first measurement apparatus. The second measurement apparatus differs from the first measurement apparatus in that a wavelength control unit 301 includes a first band rejection type variable wavelength filter 333 and a second band rejection type variable wavelength filter 335 instead of the wavelength separation filter 332 and the band rejection type variable wavelength filter 334. The second measurement apparatus includes no optical amplifier.

Backscattered light from the optical fiber under test 100 is transmitted to the first band rejection type variable wavelength filter 333 via the circulator 20. The first band rejection type variable wavelength filter 333 transmits components of Rayleigh scattered light included in the backscattered light to the optical intensity measurement unit 350 and transmits the components other than Rayleigh scattered light to the second band rejection type variable wavelength filter 335. The other configurations of the second measurement apparatus are similar to those of the first measurement apparatus.

The first measurement apparatus is configured such that the power of backscattered light from the optical fiber under test 100 is amplified by the optical amplifier when the power of backscattered light is low. Therefore, the wavelength separation filter 332 has a function of blocking ASE light generated by the optical amplification in addition to separating Rayleigh scattered light and Brillouin scattered light from each other.

On the other hand, when the power of backscattered light from the optical fiber under test 100 is sufficiently high as compared to the reception sensitivity of the self-delayed heterodyne interferometer, it is possible to block Rayleigh scattered light as noise by using the band rejection type variable wavelength filter without providing the optical amplifier as in the second measurement apparatus.

Other Exemplary Configurations

Although each of the above embodiments has been described with reference to an example in which the optical frequency shifter unit is provided in one of the two light paths of the self-delayed heterodyne interferometer 40, the present invention is not limited to this example. For example, a first optical frequency shifter unit that gives a frequency shift of a first frequency f1 may be provided in the first light path while a second optical frequency shifter unit that gives a frequency shift of a second frequency f2 (≠f1) is provided in the second light path. In this case, two local oscillation electrical signal sources, one to generate an electrical signal of the first frequency f1 and the other to generate an electrical signal of the second frequency f2, may be provided. Difference frequency components of these two electrical signals can be used for the second electrical signal.

The preferred embodiment(s) of the present invention has/have been described above with reference to the accompanying drawings, whilst the present invention is not limited to the above examples. A person skilled in the art may find various alterations and modifications within the scope of the appended claims, and it should be understood that they will naturally come under the technical scope of the present invention.

Heretofore, preferred embodiments of the present invention have been described in detail with reference to the appended drawings, but the present invention is not limited thereto. It should be understood by those skilled in the art that various changes and alterations may be made without departing from the spirit and scope of the appended claims.

What is claimed is:

1. An optical fiber strain and temperature measurement apparatus comprising:
    a light source unit configured to generate probe light;
    a wavelength control unit configured to receive backscattered light emitted from an optical fiber to be tested by the probe light and to output Brillouin backscattered light included in the backscattered light; and
    a self-delayed heterodyne interferometer to which the Brillouin backscattered light is input,
    wherein the wavelength control unit includes a wavelength separation filter, a variable wavelength filter, an optical intensity measurement unit, and a control unit,
    the wavelength separation filter has two output ports, outputs and transmits, from one of the two output ports, the Brillouin backscattered light to the variable wavelength filter, and outputs and transmits, from the other output port, Rayleigh scattered light to the optical intensity measurement unit,
    the optical intensity measurement unit measures a center wavelength and a peak intensity of the Rayleigh scattered light,
    the control unit controls a cutoff wavelength of the variable wavelength filter in accordance with a direction and amount of change of the center wavelength, and
    the variable wavelength filter operates at a cutoff wavelength that is set under control of the control unit.

2. An optical fiber strain and temperature measurement apparatus comprising:
    a light source unit configured to generate probe light;
    a wavelength control unit configured to receive backscattered light emitted from an optical fiber to be tested by the probe light and to output Brillouin backscattered light included in the backscattered light; and
    a self-delayed heterodyne interferometer to which the Brillouin backscattered light is input,
    wherein the wavelength control unit includes a first variable wavelength filter, a second variable wavelength filter, an optical intensity measurement unit, and a control unit,
    the first variable wavelength filter has two output ports, transmits Rayleigh scattered light to the optical intensity measurement unit, and transmits a component other than the Rayleigh scattered light to the second variable wavelength filter,
    the optical intensity measurement unit measures a center wavelength and a peak intensity of the Rayleigh scattered light,
    the control unit controls a cutoff wavelength of the second variable wavelength filter in accordance with a direction and amount of change of the center wavelength, and
    the second variable wavelength filter operates at a cutoff wavelength that is set under control of the control unit.

3. The optical fiber strain and temperature measurement apparatus according to claim 1, wherein the self-delayed heterodyne interferometer includes
    a splitting unit configured to split the Brillouin backscattered light into a first light path and a second light path,
    an optical frequency shifter unit provided in one of the first and second light paths, the optical frequency shifter unit being configured to give a frequency shift of a beat frequency,
    a delay unit provided in one of the first and second light paths,
    a multiplexer unit configured to multiplex light propagating through the first light path and light propagating through the second light path to generate multiplexed light,
    a coherent detection unit configured to perform heterodyne detection of the multiplexed light and to output a difference frequency as a first electrical signal,
    a local oscillation electrical signal source configured to generate a second electrical signal having the same frequency as a frequency of the first electrical signal, and
    a mixer unit configured to perform homodyne detection of the first and second electrical signals and to output a difference frequency as a phase difference signal.

4. The optical fiber strain and temperature measurement apparatus according to claim 1,
wherein the self-delayed heterodyne interferometer includes
    a splitting unit configured to split the Brillouin backscattered light into a first light path and a second light path,
    a first optical frequency shifter unit provided in the first light path and configured to give a frequency shift of a first frequency,
    a second optical frequency shifter unit provided in the second light path and configured to give a frequency shift of a second frequency,
    a delay unit provided in one of the first and second light paths,
    a multiplexer unit configured to multiplex light propagating through the first light path and light propagating through the second light path to generate multiplexed light,
    a coherent detection unit configured to perform heterodyne detection of the multiplexed light and to output a difference frequency as a first electrical signal,
    an electrical signal generator configured to generate a second electrical signal having the same frequency as the first electrical signal, and
    a mixer unit configured to perform homodyne detection of the first and second electrical signals and to output a difference frequency as a phase difference signal.

5. The optical fiber strain and temperature measurement apparatus according to claim 3,
wherein a polarization controller is provided in one of the first and second light paths, and
polarization is controlled such that an output of the coherent detection unit is maximized.

* * * * *